United States Patent [19]
Bacher et al.

[11] Patent Number: 5,526,991
[45] Date of Patent: Jun. 18, 1996

[54] APPARATUS FOR PLASTICIZING THERMOPLASTIC SYNTHETIC PLASTICS MATERIAL

[76] Inventors: Helmut Bacher, Bruck/Hausleiten 17, St. Florian A-4490; Helmuth Schulz, Badstrasse 20, St. Florian A-4490; Georg Wendelin, Waldbothenweg 84, Linz A-4033, all of Austria

[21] Appl. No.: 351,354
[22] PCT Filed: Jun. 8, 1993
[86] PCT No.: PCT/AT93/00098
  § 371 Date: Dec. 9, 1994
  § 102(e) Date: Dec. 9, 1994
[87] PCT Pub. No.: WO93/25312
  PCT Pub. Date: Dec. 23, 1993

[30] Foreign Application Priority Data

Jun. 12, 1992 [AT] Austria .................... 1212/92

[51] Int. Cl.⁶ .................... B02C 18/14; B02C 18/16
[52] U.S. Cl. .................... 241/65; 241/166; 241/236; 241/247; 241/260.1
[58] Field of Search .................... 241/65, 101.2, 241/166, 167, 235, 236, 242, 243, 247, 260.1

[56] References Cited

U.S. PATENT DOCUMENTS 4,377,259  3/1983  Areaux et al. .................. 241/236 X
4,720,254  1/1988  Wood .......................... 241/250.1 X
5,201,475  4/1993  Nakagomi ...................... 241/236
5,232,170  8/1993  Yang .......................... 241/260.1
5,375,782  12/1994 Schwelling .................... 241/236 X
5,397,065  3/1995  Shutov et al. ................. 241/260.1 X

*Primary Examiner*—Timothy V. Eley
*Attorney, Agent, or Firm*—Salter & Michaelson

[57] ABSTRACT

An apparatus for plasticizing thermoplastic synthetic plastics material, in particular scrap material, comprises a plasticizing screw (18) bearingly supported within a housing (21), to which screw the synthetic plastics material to be plasticized is supplied through a feed opening (16). At this feed opening (16) a comminuting means in the form of two shafts (3, 4) disposed parallel to each other and parallel to the axis of the screw (18) is provided, each of the shafts (3, 4) being provided with a plurality of pinned-up disk-shaped comminuting tools (8). Between each two neighboring comminuting tools (8) a circular spacer disk (9) is disposed and stationary knives (11) engage into the gaps between adjoining comminuting tools (8), the flanks (15) of which knives extend tangentially with respect to the periphery (13) of the spacer disks (9). The two shafts (3, 4) are driven with different speeds and the knives constituted by the comminuting tools (8) comminute the synthetic plastics material and press it into the volutions of the screw (18). This results in a construction which is reliable in operation and comminutes the synthetic plastics material effectively.

20 Claims, 3 Drawing Sheets

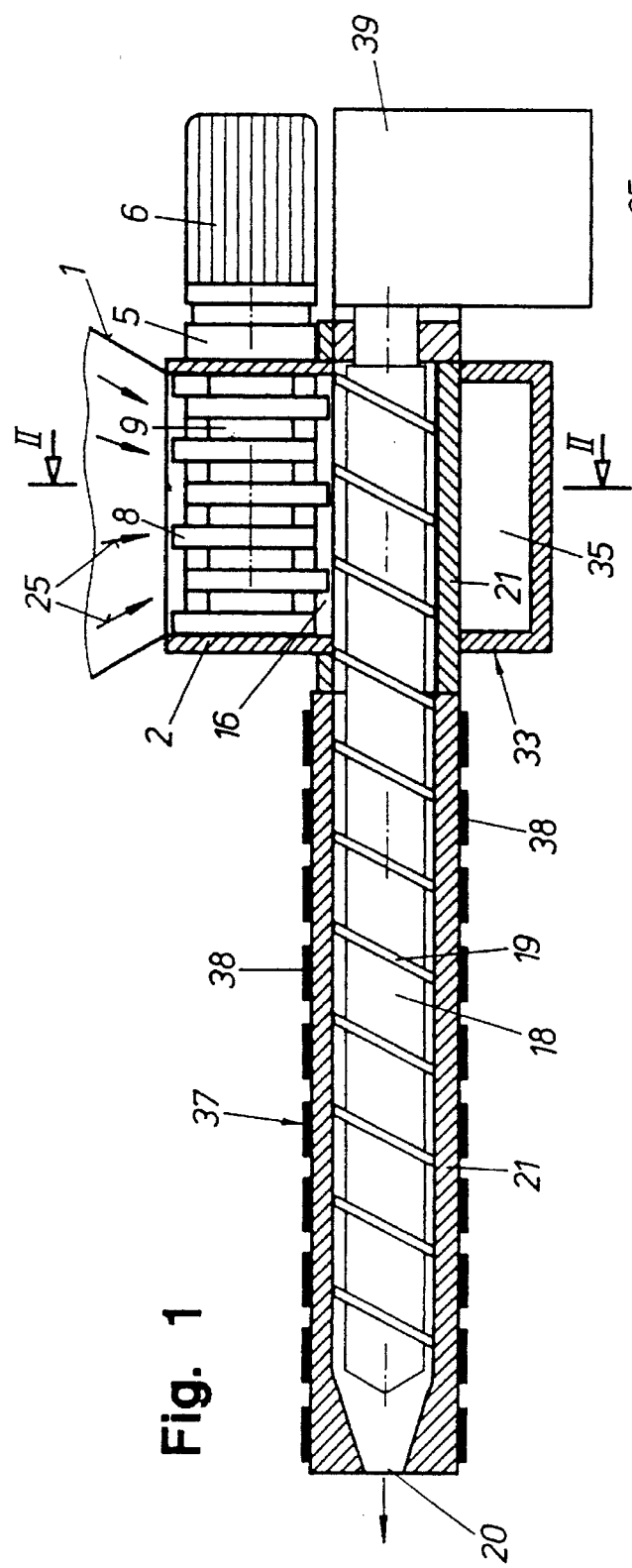
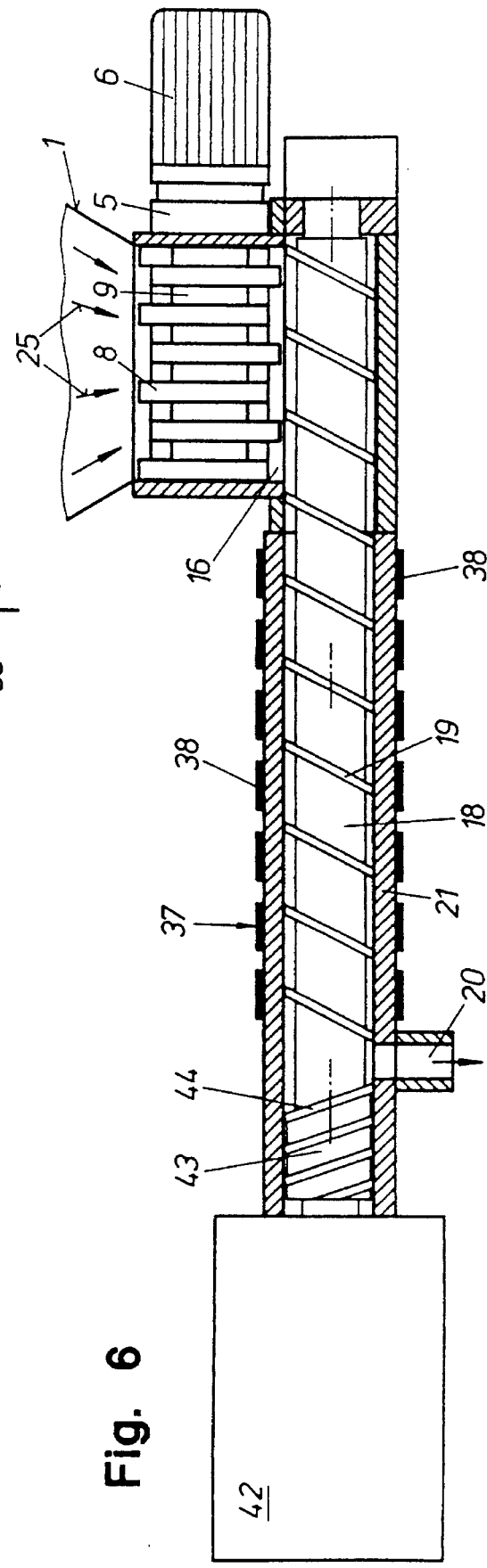

Fig. 2
Fig. 3
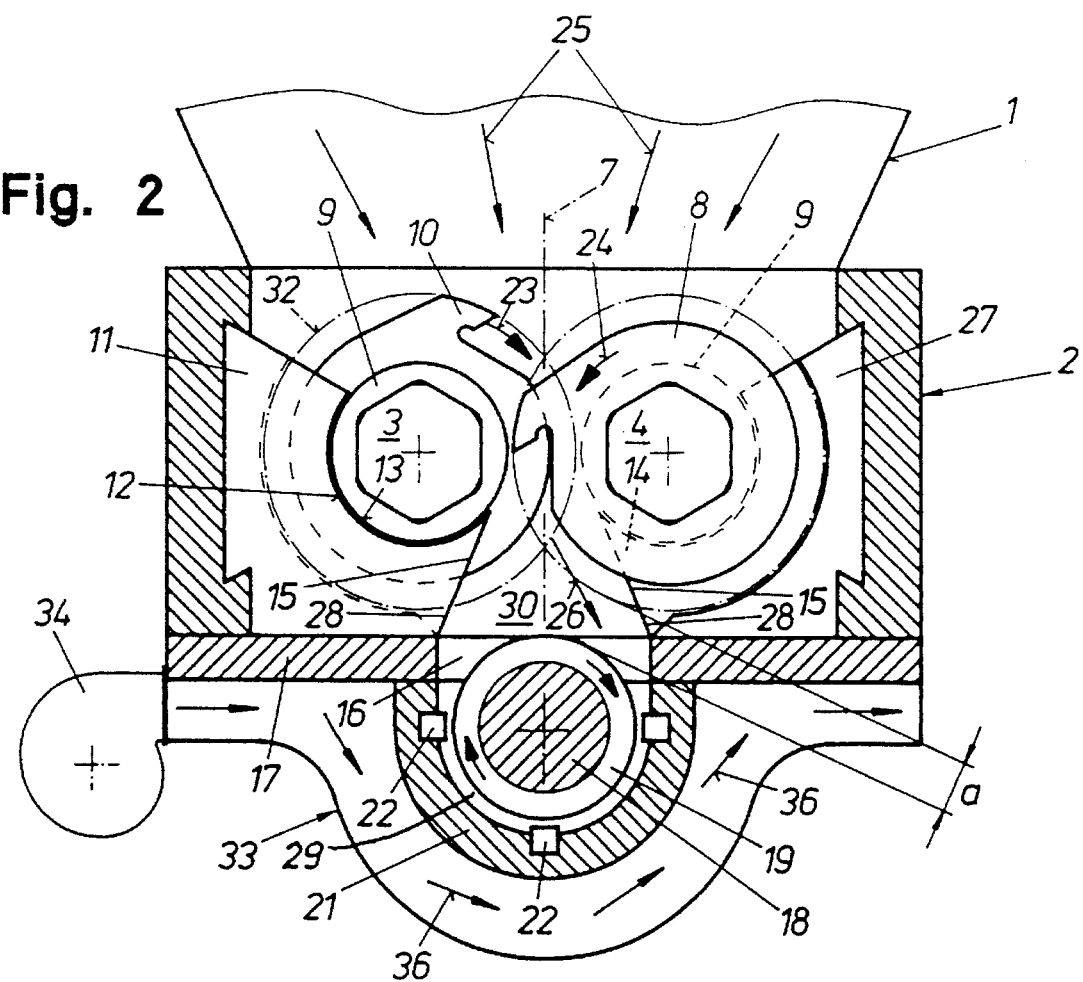
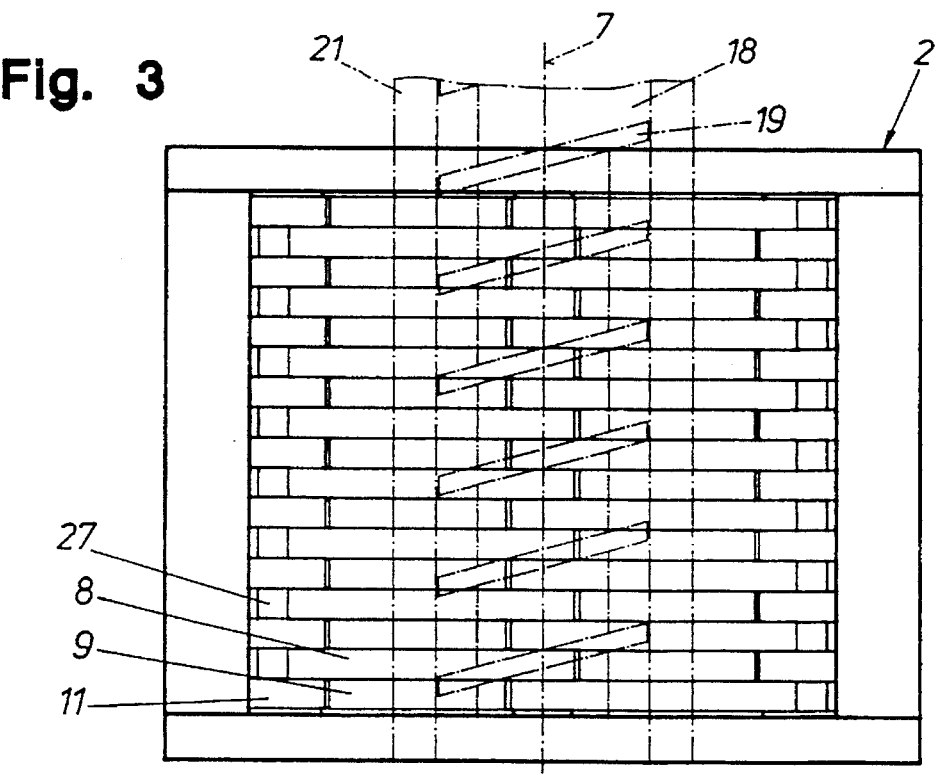

APPARATUS FOR PLASTICIZING THERMOPLASTIC SYNTHETIC PLASTICS MATERIAL

Apparatus for plasticizing thermoplastic synthetics material.

BACKGROUND AND SUMMARY OF THE INVENTION

The invention relates to an apparatus for plasticizing thermoplastic synthetic plastics material, in particular synthetic plastics scrap material, comprising a screw bearingly supported within a housing, to which screw the material to be plasticized is supplied through a feed opening of the housing, said screw conveying the synthetic plastic material to an exit opening for the plasticized synthetic plastics material disposed in axial distance from the feed opening, a comminuting means for the syntectic plastics material being attached to the feed opening, which comminuting means comprises comminuting tools disposed on two shafts which extend parallel to each other and preferably parallel to the axis of the screw and are driven in opposite directions, which comminuting tools convey the comminuted synthetic plastics material into the feed opening of the screw housing, each of the comminuting tools being provided with teeth acting on the synthetic plastics material supplied between the shafts.

Within such apparatus there is the problem that the synthetic plastics material which in most cases is supplied in form of scrap material, must be comminuted but nevertheless must be reliably supplied to the screw without blocking the revolution of the comminuting tools and, respectively, or the screw. The known proposals were not satisfying with this respect.

It is the task of the invention to improve an apparatus of the initially described kind so that the problem mentioned above is solved satisfactory, that means that on the one hand the supplied synthetic plastics material is effectively comminuted and that on the other hand the comminuted synthetic plastics material is reliably taken along by the screw and is plasticized and is discharged through the exit opening without that the shafts carrying the comminuting tools or, respectively, the screw are blocked. The invention solves this task by the features that the shafts are driven with different speeds of revolution, the direction of revolution of the shaft running with greater speed being opposite to the direction of revolution of the screw, that the comminuting tools are disposed axially spaced apart from each other on the shaft, the orbits of the teeth of the comminuting tools of the two shafts overlapping each other, when seen in axial direction of the shafts, and that at least on the shaft running with greater speed spacer disks having a circular periphery are disposed between neighboring comminuting tools, stationary filter elements engaging between the comminuting tools of this shaft and extend with their flanks facing the gap between the shafts tangentially with respect to the periphery of the spacer disks of this shaft. The shafts running with different speeds effectively comminute the supplied synthetic plastics material by means of the teeth of the comminuting tools, in as much, so to speak, neighboring comminuting tools frictionally engage each other. Thereby, the comminuted synthetic plastics material is reliably freed from the comminuting tools and is not, as this was frequently the case within the known proposals, conveyed in a circle around the respective shaft. This is also supported by the tangentially extending flank of the stationary knife which, so to speak, strips off the syntectic plastics material elements which have proceeded in radial direction inwardly to the spacer disks from the spacer disks and also from the substantially disk-shaped comminuting tools. Thereby a stuffing component which is directed substantially tangential with respect to the shaft running with greater speed is exerted onto the comminuted synthetic plastics material, which force component tends to press the syntectic plastics material in direction towards the screw and into the revolutions thereof. Particularly favorable results are obtained if these flanks extend also tangentially with respect to the wall of the feed opening, since in such a manner it is ensured that the synthetic plastics material supplied to the screw by the two shafts is continuously taken along.

From the EP-A-140,869 an apparatus for comminuting scrap material, above all burnable scrap material is known in which the comminuted material is supplied to a screw press for briquetting. For comminuting the scrap material, comminuting tools are provided on two oppositely driven shafts that extend parallel to each other and parallel to the axis of the screw, which tools convey the comminuted scrap material towards the screw. The comminuting tools have teeth acting on the scrap material which is supplied between their shafts and are disposed in axial distance from each other on the shafts so that the orbits of the teeth of the two shafts overlap each other. Between neighboring comminuting tools spacer disks having a circular periphery are provided and stationary knives extend between the comminuting tools of the shafts.

Further it is known (DE-A-2,450,936), (DE-A-3,430,087), to drive two cutter shafts disposed parallel to each other of an apparatus for disintegrating bulky goods or, respectively, for comminuting scrap material in opposite directions and with different speeds.

According to a preferred embodiment of the invention both shafts are provided with circular spacer disks disposed between the disk-like comminuting tools, to which spacer disks the flanks of the stationary knives extend tangentially and symmetrically with respect to the central plane between the two shafts, and preferably those peripheral sections of the stationary knives which adjoin these flanks in direction of revolution of the shafts extend following the periphery of the spacer elements. Thereby the favorable effects mentioned above are ensured for both shafts of the comminuting means.

Further, investigations have shown that it is favorable to dispose a certain clearance between the two shafts of the comminuting means and the screw. Within the spirit of the invention, such a clearance can be constituted by the feature that the orbit of the tips of the teeth is spaced apart from the periphery of the screw volutions in a distance that amounts to 0.5 to 1.5 times the distance by which the orbit of teeth tips is spaced apart from the periphery of the spacer disks. Thereby, blockings of the revolving elements are still better avoided.

For the purpose to avoid that the comminuted synthetic plastics material taken along by the screw revolves together with the revolving motion of the screw and thereby is not conveyed effectively towards the exit opening, according to a further embodiment of the invention at least in the region of the feed opening protrusions or grooves are provided in the wall of the housing of the screw disposed spaced apart from the periphery of the screw volutions, which protrusions or grooves preferably extend in axial direction of the screw. These protrusions or grooves, respectively, prevent that the synthetic plastics material runs together with the screw.

BRIEF DESCRIPTION OF THE DRAWINGS

Further features and advantages of the invention can be seen from the description of examplative embodiments shown schematically in the drawing. FIG. 1 shows a longitudinal section through the apparatus. FIG. 2 is a cross section taken along the line II—II of FIG. 1, in an enlarged scale. FIG. 3 shows a variant in top view. FIGS. 5 and 6 each show a further embodiment taken in a section similar to FIG. 1.

DETAILED DESCRIPTION OF THE INVENTION

Figure 4:
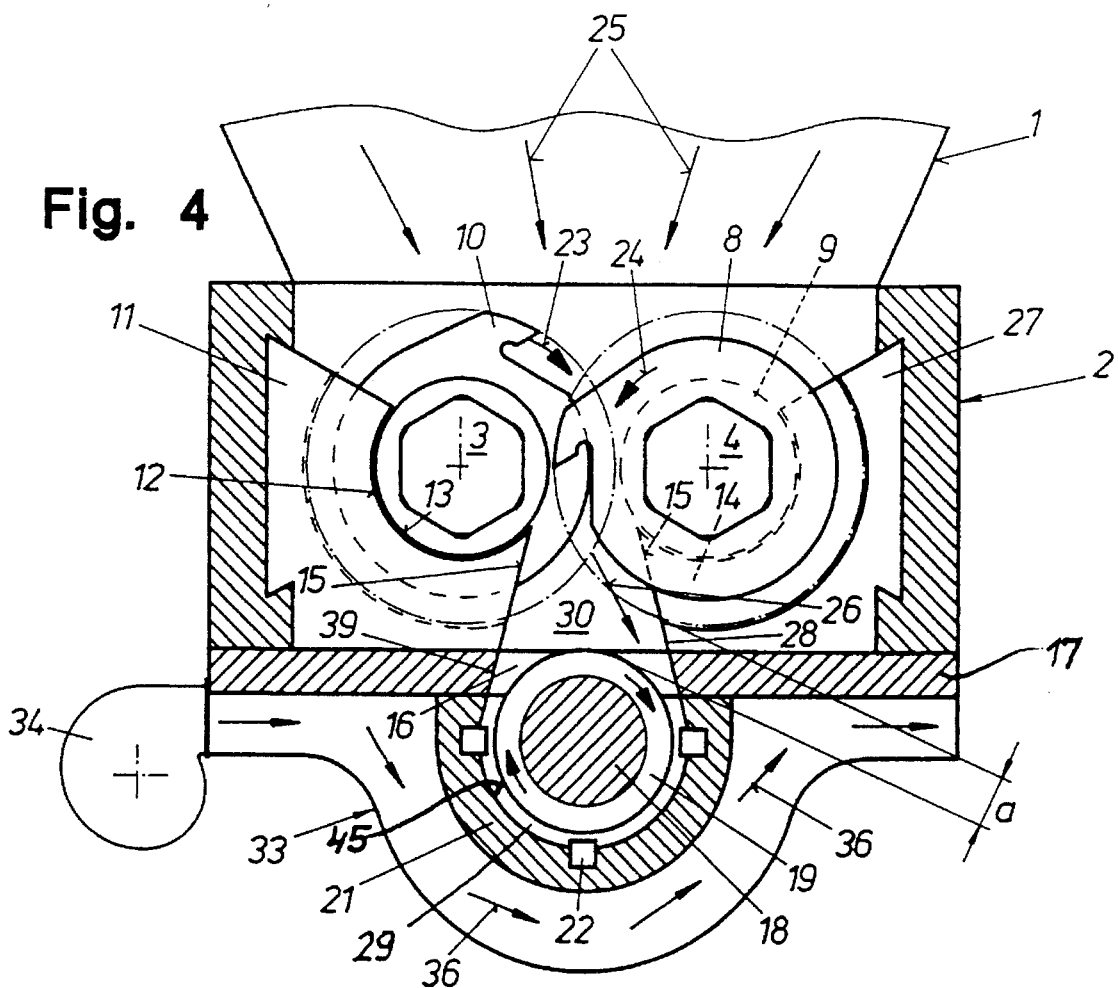
FIG. 4 shows a further variant taken in a section similar to FIG. 2.

Within the embodiment according to FIGS. 1 and 2 the thermoplastic synthetic plastics material to be plasticized, mostly in form of recycling-articles or scrap material, is introduced into the apparatus through a funnel 1. The funnel leads into a housing 2 in which two shafts 3, 4 are bearingly supported for rotation around horizontal axes which extend parallel to each other. The two shafts 3, 4 are driven in common by a motor 6 via a gear means 5, and this in opposite directions and with different speeds of revolution, so that the shaft portions neighbouring the central plane 7 (FIG. 2) run from above to below. Each shaft has a hexagonal cross section and comminuting tools 8 in form of toothed disks and circular spacer disks 9 are pinned up on the two shafts alternating with each other. The comminuting tools 8 have a greater diameter than the spacer disks 9 and the arrangement is so chosen that the orbits of the teeth of the comminuting tools 8 overlap each other, when seen in axial direction of the shafts 3,4. Suitably, the orbits of the teeth 10 extend near to the periphery of the spacer disks 9. The lateral surfaces of the comminuting tools 8 and of the spacer disks 9 extend perpendicularly to the axial direction of the shafts 3, 4, and these lateral surfaces engage each other so that a stripper effect is exerted onto the synthetic plastics material on all these surfaces. On that side which does not face the respective other shaft 3 or 4, stationary knives 11 extend between neighbouring comminuting tools 8, and the peripheral section 12 of these knives facing the respective shaft 3 or 4 follows the periphery 13 of the circular spacer disk 9. This peripheral section 12 extends at least on the shaft 4 running with greater speed up to a tooth-like protrusion 14, the flank 15 thereof extends tangentially to the periphery 13 of the respective spacer disk 9 and from there towards a feed opening 16 in the bottom 17 of the housing 2, through which opening 16 the comminuted synthetic plastics material reaches a screw 18 which takes along the material by its screw volutions 19 and conveys it towards an exit opening 20 (FIG. 1) disposed spaced apart from the feed opening 16 in axial direction, so that the synthetic plastics material is plasticized. Further apparatus known per se, for example filters, extruder plants and the like may be connected to the opening 20.

The direction of revolution of the screw 18 is opposite to the direction of revolution of the shaft 4 running with greater speed. At least in the region of the feed opening 16, the screw 18 or, respectively, its volutions 19 are spaced apart from the housing 21 of the screw. Protrusions 22 are inserted into the wall of that part of this housing 21 which is disposed in the region of the feed opening 16, which protrusions suitably extend in axial direction of the screw 18. These protrusions 22 prevent that the synthetic plastics material taken along by the screw 18 rotates together with the screw. Instead of protrusions 22, also longitudinal grooves in the housing 21 may be provided. Suitably, the periphery of the screw volutions 19 is flush with the top surface of the bottom 17.

The directions of revolution of the two shafts 3,4 are indicated by arrows 23 or 24, respectively. Each comminuting tool 8 suitably has several teeth 10 from which one single each is shown in FIG. 2 for simplification's sake. The teeth 10 catch the synthetic plastics material supplied in the funnel 1 in direction of the arrows 25 between the shafts 3, 4 and tear it, which effect is still increased by the different speeds of revolution of the shafts 3, 4. Suitably, the ratio of the speeds of revolution of the shafts 3, 4 is about 1:2 to 1:5. The shaft 4 running with greater speed imparts to the comminuted synthetic plastics material a component of movement in direction of the arrow 26, what constitutes a stuffing component that tends to press the synthetic plastics material into the volutions of the screw 18. Within this, the flanks 15 of the stationary knives 11 act as guiding surfaces for the synthetic plastics material so that it cannot avoid but is pressed into the feed opening 16. For the purpose to also prevent that the synthetic plastics material can avoid between adjoining stationary knives 11, the gaps between neighbouring disk-shaped stationary knives 11 are filled by filler elements 27 which on their sides facing the shafts 3 or 4 extend up to the periphery or, respectively, to the orbit of the teeth 10 and, as well as the stationary knives 11, rest on the bottom 17. The ends of the filler elements 27 are disposed at the feed opening 16 and have there flanks 28 that are inclined towards the same side as the flanks 15 of the stationary knives 11 and suitably are flush with the flanks 15 of the stationary knives 11.

As it is shown in FIG. 2, in the region of the feed opening 16 of the screw 18, its housing 21 is spaced apart from the outer periphery of the volutions 19 so that an annular free space 29 is formed into which protrude the protrusions 22. A further free space is built up above the feed opening 16 by the fact that there is a distance a between the orbit of the teeth 10 of the two shafts 3, 4 and the periphery of the screw volutions 19, which distance as a rule amounts to 0.5 to 1.5 times the distance between the orbit 32 of the tips of the teeth 10 and the periphery 13 of the spacer disks 9. This free space avoids blocking of the shafts 3,4 or, respectively, of the screw 18.

As a rule, the synthetic plastics material is substantially heated up during its comminuting by the comminuting tools 8. In order to avoid an overheating of the synthetic plastics material in the region of the feed opening 16 and thereby a thermic damage of the synthetic plastics material or a blocking by glueing by plasticizing within the comminuting chamber or, respectively, in the screw intake, a cooling means 33 may be provided in the region of the feed opening 16, for example a cooling blower 34 that blows cooled air into a cooling channel 35 surrounding the intake housing 21 of the screw 18, cooling air streaming in this channel in direction of the arrows 36. In order to ensure plasticizing of the synthetic plastics material, heating devices 37 may be provided at the outer periphery of the housing 21 of the screw 18 in that region of the housing which follows the feed opening 16, for example heating bands 38 surrounding the jacket of the housing 21.

The screw is driven by a drive means 39 disposed at that end of the screw that opposes the exit opening 20.

Suitably, the arrangement of the comminuting tools 28, the spacer disks 9, the stationary knives 11 and the filler elements 27 is symmetrical with respect to the vertical central plane 9 in order to make the construction easy to survey.

For simplification's sake, in FIG. 1 only a few comminuting tools 8 or spacer disks 9, respectively, are shown. As it can be seen from FIG. 3, however, in practice the number of the comminuting tools 8 forming rotor knives, as a rule is relatively great and correspondingly great is also the number of the spacer disks 9 or of the stationary knives or of the filler elements 27, respectively.

Within the embodiment according to FIG. 4, the flanks 15 of the stationary knives 11 extend not only tangentially to the periphery of the spacer disks 9, but also tangentially with respect to the periphery of the inner wall 45 of the screw housing 21 or to the wall of the feed opening 16, respectively. Thereby, the intake of the synthetic plastics material comminuted by the two shafts 3, 4 or their comminuting tools 8, respectively, into the volutions of the screw 18 is still further enhanced.

Figure 5:
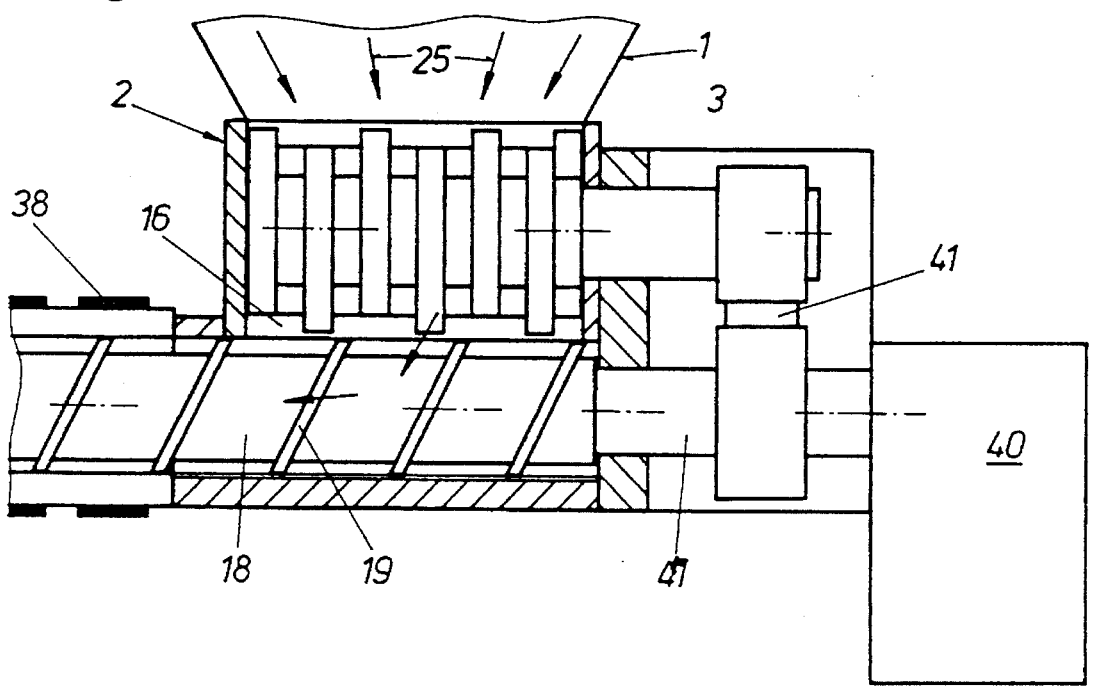

Within the embodiment according to FIG. 5, a common drive means 40 is provided for the screw 18 and for the two shafts 3, 4. For this, an elongation 47 of the shaft of the screw 18 is coupled by means of a toothed belt drive 41 to the two shafts 3, 4. The necessary ratio of transmission or, respectively, the different speeds of revolution of the shafts 3, 4 can be obtained by different number of teeth of the pinions constituting the toothed belt drive 41. Instead of a toothed belt drive also a chain drive means may be used.

Within the embodiment according to FIG. 6 the screw 18 is provided with a tip drive means 42 which, therefore, is disposed at that end of the screw 18 that neighbors the exit opening 20. Within this, in a known manner a section 43 of the screw shaft is provided which follows the exit opening 20 and comprises screw volutions 44, the pitch thereof is opposite to that of the plasticizing screw 18. This section 48 provides for the necessary sealing.

We claim:

1. Apparatus for plasticizing thermoplastic synthetic plastics material comprising a screw (18) bearingly supported within a housing (21), to which screw the material to be plasticized is supplied through a feed opening (16) of the housing (21), said screw conveying the synthetic plastics material to an exit opening (20) for the plasticized synthetic plastics material disposed in axial distance from the feed opening (16), a comminuting means for the synthetic plastics material being attached to the feed opening (16), which comminuting means comprises comminuting tools (8) disposed on two shafts (3, 4) which extend parallel to each other and preferably parallel to the axis of the screw (18) and are driven in opposite directions, which comminuting tools convey the comminuted syntectic plastics material into the feed opening (16) of the screw housing (21), each of the comminuting tools being provided with teeth (10) acting on the synthetic plastics material supplied between the shafts (3, 4) characterized in that the shafts (3, 4) are driven with different speeds of revolution, the direction of revolution of the shaft (4) running with greater speed being opposite to the direction of revolution of the screw (18), that the comminuting tools (8) are disposed axially spaced apart from each other on the shafts (3, 4), the orbits of the teeth (10) of the comminuting tools (8) of the two shafts (3, 4) overlapping each other, when seen in axial direction of the shafts (3, 4), and that at least on the shaft (4) running with greater speed spacer disks (9) having a circular periphery (13) are disposed between neighbouring comminuting tools (8), stationary knives (11) engaging between the comminuting tools (8) of this shaft (4), said knives having flanks (15) facing the gap between the shafts (3, 4) tangentially with respect to the periphery (13) of the spacer disks (9) of the shaft (4).

2. Apparatus according to claim 1, characterized in that the flanks (15) extend also tangentially with respect to the wall (39) of the feed opening (16).

3. An apparatus as set forth in claim 1, said spacer disks being disposed between the comminuting tools and extending tangentially and symmetrically with respect to a central plane between the two shafts, said stationary knives having peripheral sections which are adjacent the flanks.

4. Apparatus according to claim 1, characterized in that the orbit of the outermost portions of the teeth (10) is spaced apart for a distance (a) from the periphery of the screw volutions (19), which distance amounts to 0.5 to 1.5 times the distance for which the orbit of these tooth portions is spaced apart from the periphery of the spacer disks (9).

5. Apparatus according to any of claim 1, characterized in that filler elements (27) are provided between neighbouring stationary knives (11).

6. An apparatus as set forth in claim 1, said housing having a wall with protrusions which are spaced apart from the periphery of the screw, said protrusions extending in an axial direction of the screw.

7. An apparatus as set forth in claim 1 further comprising a cooling device associated with the housing.

8. An apparatus as set forth in claim 1 further comprising a heating device associated with the housing.

9. Apparatus according to claims 1 characterized in that the screw (18) and the two shafts (3, 4) are driven by a common drive means (40) (FIG. 5).

10. An apparatus for plasticizing thermoplastic synthetic plastics material comprising:

a housing having means for bearingly supporting for rotation a screw, a feed opening formed therein through which the material to be plasticized is supplied to the screw, and an exit opening for the plasticized material, said exit opening being spaced in axial distance from the feed opening;

comminuting means, positioned before the feed opening, for treating the material to be plasticized, said comminuting means comprising comminuting tools;

two shafts on which said comminuting tools are disposed, said shafts being parallel to each other and driven in opposite directions, said shafts being driven at different speeds of revolution wherein the direction of revolution of the shaft which rotates at a greater speed is directed opposite to the direction of the revolution of the screw, each said comminuting tool being provided with teeth which act on the material to be plasticized said comminuting tools being disposed axially spaced-apart from each other on the shafts, said teeth of the comminuting tools of the two shafts having orbits which overlap each other;

spacer disks, each having a circular periphery, disposed between adjacent comminuting tools at least on the shaft being driven at said greater speed of revolution; and stationary knives which protrude between the comminuting tools of the shaft being driven at said greater speed of revolution, said knives having flanks which face a gap between the shafts and extend tangentially with respect to the periphery of the spacer disks of the shaft being driven at said greater speed of revolution.

11. An apparatus as set forth in claim 10, said two shafts being parallel to the axis of the screw.

12. An apparatus as set forth in claim 10, said comminuting tools conveying the comminuted plasticized material into the feed opening of the housing.

13. An apparatus as set forth in claim 10, said feed opening being formed in a wall of the housing, and said flanks extending tangentially with respect to said wall.

14. An apparatus as set forth in claim 10, said spacer disks being disposed between the comminuting tools and extending tangentially and symmetrically with respect to a central plane between the two shafts, said stationary knives having peripheral sections which are adjacent the flanks.

15. An apparatus as set forth in claim 10, the orbit of the teeth being spaced apart a distance from the periphery of the screw, said distance being 0.5 to 1.5 times the distance in which the orbit of the teeth is spaced from the periphery of the spacer disks.

16. An apparatus as set forth in claim 10 further comprising filler elements provided between adjacent stationary knives.

17. An apparatus as set forth in claim 10, said housing having a wall with protrusions which are spaced apart from the periphery of the screw, said protrusions extending in an axial direction of the screw.

18. An apparatus as set forth in claim 10 further comprising a cooling device associated with the housing.

19. An apparatus as set forth in claim 10 further comprising a heating device associated with the housing.

20. An apparatus as set forth in claim 10, said screw and two shafts being driven by a common drive means.

* * * * *